March 24, 1970  K. H. KRECKEL ET AL  3,502,414
OPTICAL ELECTRIC SYSTEM

Filed Aug. 8, 1967  3 Sheets-Sheet 1

KURT H. KRECKEL
ERWIN G. LOEWEN
ROBERT J. MELTZER
INVENTORS

BY Charles C. Krawczyk

ATTORNEY

KURT H. KRECKEL
ERWIN G. LOEWEN
ROBERT J. MELTZER
INVENTORS

United States Patent Office 3,502,414
Patented Mar. 24, 1970

3,502,414
OPTICAL ELECTRIC SYSTEM
Kurt H. Kreckel, Penfield, Erwin G. Loewen, East Rochester, and Robert J. Meltzer, Irondequoit, N.Y., assignors to Bausch & Lomb Incorporated, Rochester, N.Y., a corporation of New York
Continuation-in-part of application Ser. No. 275,540, Apr. 25, 1963. This application Aug. 8, 1967, Ser. No. 659,108
Int. Cl. G01b 11/26
U.S. Cl. 356—152                                   18 Claims

ABSTRACT OF THE DISCLOSURE

Apparatus for accurately measuring movement including a scale mounted for movement with respect to a plurality of reticles arranged in optical series with the scale and having a positional phase shift between various reticles and the markings on the scale thereby defining a plurality of light valves. Radiation is sequently directed from a single light source through the plurality of light valves to a single photosensor. The photosensor generates an electrical signal, the phase of which changes with the position of the scale. The phase relation between the electrical signal and a reference signal is maintained substantially constant to provide an indication of the position and/or movement of the scale.

CROSS-REFERENCES TO RELATED APPLICATION

This application is a continuation-in-part of a prior application, Ser. No. 275,540, filed on Apr. 25, 1963, now abandoned. The scale illumination and sensing system is disclosed and claimed in a copending application of Erwin G. Loewen and Robert J. Meltzer, Ser. No. 645,933 filed June 14, 1967 now Patent No. 3,354,319 and is a continuation-in-part of an application Ser. No. 275,539 filed on Apr. 25, 1963, now abandoned. A centering system for a circular scale is disclosed in a copending application of Robert J. Meltzer, Ser. No. 625,470, now abandoned, filed Mar. 23, 1967 and is a continuation-in-part of an application Ser. No. 275,541, filed Apr. 25, 1963, now abandoned. All the copending applications have been assigned to the assignee of the present application.

BACKGROUND OF THE INVENTION

This invention relates to optical-electrical instruments for measuring the movement and/or position of a scale.

Generally, angular measuring instruments are divided into two basic systems. The first of these include two or more mirrors that are mounted on a rotating table. This system offers an advantage since it is not necessary to perfectly align the mirror with respect to the axis of rotation. Systems of this type are based on stepping off of equal increments and include the disadvantages inherent in such systems. The systems are also relatively large and cumbersome since they consist of either grid digitizing autocollimators or an equivalent interference system.

The rotating mirror systems produce an angular determination which is a function of the sine of the angle. Thus linear results require a conversion to determine the angular measurement. Furthermore, a relatively high degree of interpolation is required. The mirrors in the systems are several degrees apart and therefore, the separation between fiducial marks required for the extraordinary accuracy sought in the present system, would approach a million places.

The relatively long optical paths in the first type of systems require a relatively high degree of control over the atmosphere. In the absence of such control the atmospheric turbulence or the temperature gradient would cause erroneous results which are capable of accumulating. A temperature gradient across the mirrors for example, may destroy the calibrated accuracy of the system. Maintaining accurate and stable conditions in the relatively cumbersome apparatus required in these types of systems is relatively difficult. Fringe counting systems which fall in this category also require barometric compensations or correction, and therefore, require further complex apparatus.

The present invention is characterized by a second basic system. Such systems include optical or electrical circular rulings whose positions are sensed by matching pickup devices. Providing identical centers of rotation for a scale and a table constitutes a relatively serious problem. This problem has been overcome to a relatively high degree however, by the novel method disclosed and claimed in the copending application of Robert J. Meltzer, Ser. No. 625,470.

There are certain prior art devices which can be classified under the second basic system. For example, the so-called inductive scales which are electrical readout systems. Such systems have two principle disadvantages. They are susceptible to periodic error between divisions. Brushes pick up signals from the rotating components, and even if a magnetic oxide coated disc is used and magnetic fields are imposed, the same periodic error is present. Furthermore, magnetic and optical coded scales according to conventional systems have no means for averaging many divisions to thereby prevent accidental errors. Averaging many divisions prevents errors which are caused by individual and unique scale divisions.

Advantageously an optical system according to the present invention includes a simple imaging system combined with photodetectors to form a relatively compact system. This system is relatively compact with respect to the elaborate pointing devices incorporated in the systems of the first basic type. Furthermore the present system is effective to measure angular displacement directly rather than indicating a sine function, and therefore, the system overcomes the necessity for computing the angle from a linear function of the angle. The problem of interpolation has also been overcome to a relatively high degree and yet the separation of fiducial marks has only been divided into a few hundred pieces. The latter problem was minimized by having scale lines which are only seconds apart.

The present systems incorporate relatively short optical paths. These short optical paths are effective to overcome to a high degree the problems associated with turbulence. From a practical standpoint this problem may be considered to be completely eliminated. Furthermore, this problem is overcome without requiring barometric corrections such as those needed in interferometric systems. The present system is relatively compact, light and incorporates a relatively simple imaging system which facilitates mounting and obtaining stability. The compact size and symmetry of the unit also tends to reduce the problem associated with thermal gradients across the scale. Minimizing the effect of thermal gradients overcomes the necessity for relatively complex compensating systems.

SUMMARY OF THE INVENTION

A scale having reflective or transparent markings thereon is mounted for movement along a predetermined path. A plurality of reticles are mounted along the path with different positional phase relations between various ones of the reticles and the markings on the scale. Radiation is reflected from the scale, or transmitted through the scale (depending upon the type of scale employed) through the plurality of reticles to a single photosensor.

As the scale moves, the intensity of radiation passing through the reticles varies in a cyclic pattern with a preset phase shift between the cyclic patterns of various ones of the reticles. The radiation received by the photosensor is sequentially interrupted so that the photosensor generates an electrical signal that is phase related to the position of the scale. Automatic means maintains the phase relation between the electrical signal and a comparison signal substantially constant providing an indication of the movement and/or position of the scale.

DESCRIPTION OF THE PREFERRED EMBODIMENTS

Illumination and sensing system

Figure 1:
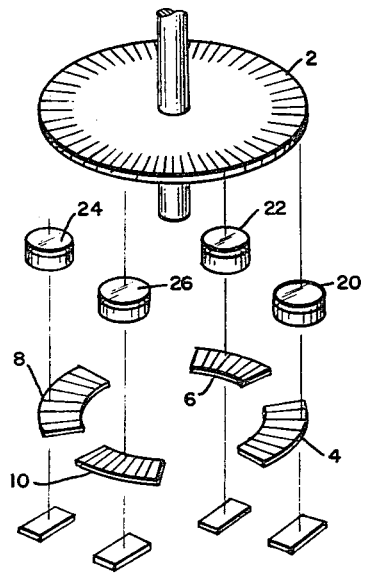
FIG. 1 is a schematic illustration of the novel system according to the present invention which shows a circular scale, reticle and photodetector arrangement according to the present invention.

The first embodiment of the illumination and sensing systems are described with reference to FIGS. 1-3. A scale 2 and reticles 4, 6, 8 and 10 are preferably illuminated by means of a single light source 12 and a furcate bundle 14 of optical fibers. Light from the light source is directed to the reticle-scale combination by means of the fiber bundle 14. The portion of light passing through the reticle-scale combination is conducted to a photomultiplier 16 by means of a second furcate bundle 18 of optical fibers. There are numerous advantages obtained by using fiber bundles in the present system. For example, a single light source can be used to illuminate a plurality of reticles. Similarly the fiber bundles make it possible to use a single photodetector for all reticles. Using a single detector and a single light source overcomes to a high degree any problems associated with varying light intensity or varying detector sensitivity. The fiber bundles also eliminate the need for slip rings or other contact means which would be in contact with the rotating table. The slip rings or contact means would be required to eliminate problems associated with stray light.

Locating the light source at a distance from the scale and conducting light to the scale by means of optical fibers tends to minimize errors which would result from a temperature change in the vicinity of the scale. Preferably the structure of the bundle should appear in the same plane as the lines of the reticle. This arrangement may be accomplished by means of an appropriate optical system, that is, one which images the end of the fiber bundle onto the lens which in turn images the scale onto the reticles.

The scale, scale mounting, centering arrangement and means for protecting the system may be varied for particular applications. In the presently preferred embodiments it has been found desirable to include a circular scale which is ruled for 360°. Generally, it is thought to be impractical to produce a full circle scale in the hundredth arc second range. The use of scale ruling facilities such as those used in the manufacture of optical gratings may overcome this difficulty to a degree, for example, any periodic errors resulting in the operation of a ruling engine may be compensated to a certain degree by conventional techniques. If the number of lines are maximized, however, the spacings will be too small to be resolved by presently available optics. Therefore, a compromise should be made, i.e. between a relatively wide spacing which would require a relatively high burden on the interpolation scheme, and a scale so fine that diffraction effects interfere with the determination of position.

The imaging system such as the lenses 20, 22, 24 and 26 images portions of the scale onto the reticles. The quality of the optics in the imaging system are such that the images have the desired contrast and low distortion. As the spacing of the scale becomes smaller and as the number of images imaged becomes large, it becomes more difficult to obtain satisfactory contrast and distortion characteristics. It is desirable to image a relatively large number of scale lines in order to take advantage of an averaging effect. The averaging effect tends to overcome small accidental errors which would cause a corresponding loss in the accuracy of the entire system.

Centering

The scale may be centered by ruling a circle on the scale at the time of manufacture. After the scale is mounted the circle is tracked by means of a microscope. Adjustments are made on the scale or mounting means until the scale tracks true. In some cases marks are made on the scale at intervals such as 90°, 180° and 270°, and multiple microscopes may be used to determine centration. In some cases small errors in centration may be overcome by a self compensating system. A system of this type would mix the signals from plural reticles having the same relative position to the scale. For example, a furcate bundle of fibers would facilitate such mixing.

The reticles

The scale is imaged onto the reticles to thereby form a light valve. Even though the same effect might be obtained by placing the scale and reticle in close proximity, such as the familiar moire systems, the use of an imaging system facilitates protecting the scale and reticle from the resulting risk of damage. An attempt to overcome the problem by using collimated light would require the use of a relatively high quality lens to reduce the angular substense of the source. This approach would substantially reduce the amount of light and further complicate the system.

The reticles and associated lenses are aligned in order to facilitate making adjustments and sensing the effects of such adjustments. The adjustments include a focusing adjustment, two translations perpendicular to the focus, and rotation about the optical axes. Generally these adjustments are made according to the method disclosed and claimed in the aforementioned copending application Ser. No. 625,470. Briefly, the method disclosed and claimed therein comprise the steps of making a relatively crude adjustment with a microscope or a plurality of microscopes which have been substituted for the receiving fiber bundle. The second step or the ultimate adjustment incorporates appropriate electrical signals. The scale is rotated and the amplitude of the A-C signal resulting will be peaked or maximized.

Figure 3:
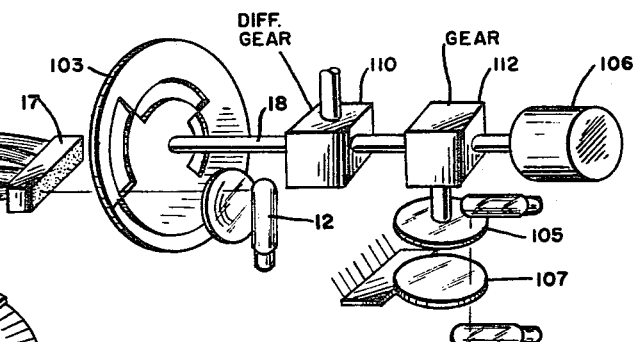
FIG. 3 is a schematic illustration of a first embodiment of the invention.
Figure 4:
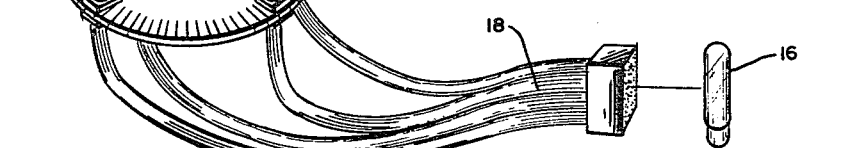
FIG. 4 is a fragmentary schematic view which illustrates a second embodiment of the invention.
Figure 4:
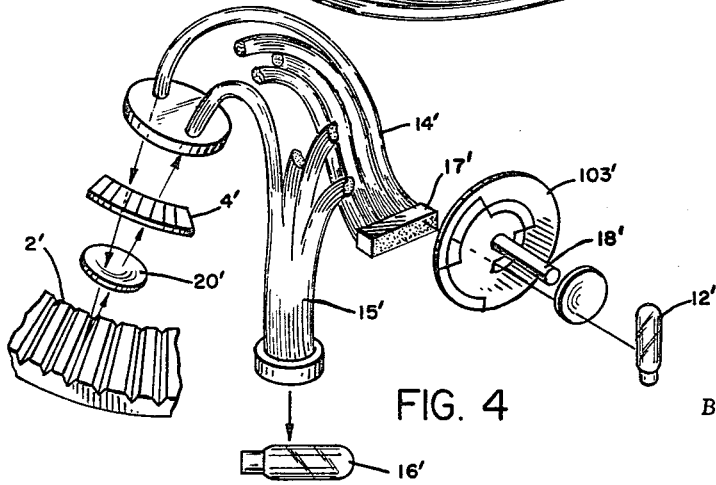

An alternative illumination and sensing system is shown in FIG. 4. This system is generally similar to the system shown in FIG. 3, however, includes a reflective scale 2' rather than the scale of FIGURE 3 which transmits light. The scale 2' is illuminated by the light source 12' through the chopper disc 103' and furcate bundle 14'. The differences in reflected light are transmitted by means of a portion of a second furcate bundle 15 to a photomultiplier tube 16'.

The sequencing chopper

The portion of the furcate bundle 14 facing the chopper disc 103 is arranged in a suitable mounting means 17 with the individual branches of the bundle 14 juxtaposed to form a straight row with the ends positioned in a plane parallel to that of the disc 103. The disc 103 includes four arcuate radiation transparent slots (one for each of the branches in the furcate bundle 14) radially spaced from the point of rotation (shaft 18) according to the spacing of the ends of the branches in the mounting means 17. As the disc 103 rotates, radiation is sequentially directed from the source 12 to the photosensor 16 through one branch at a time.

The electronic system

Figure 5:
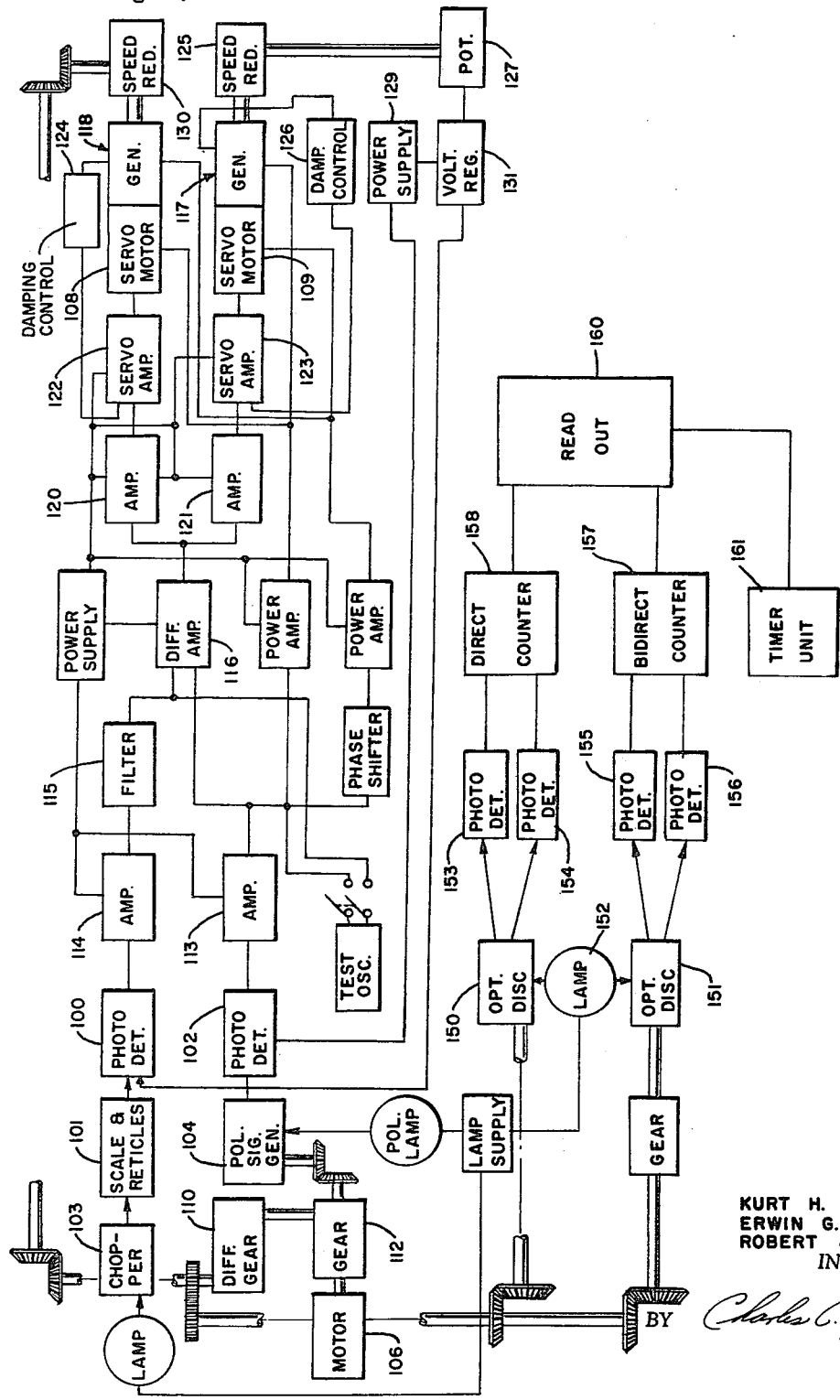
FIG. 5 is a block diagram of the readout electronics and servo-systems incorporated in one embodiment of the present invention.

The electronic system for measuring and displaying the angular information from the scale reticle combination is made up of a number of sub-systems. The operation of these sub-systems is described hereinafter with reference to FIG. 5.

The servosystem

Two photodetector circuits 100 and 102 generate electrical signals from the radiation incident upon them. The first photodetector circuit 100 including the photomultiplier tubes 16 receives a periodic series of radiation pulses through the scale-reticle or attenuator combination 101 and the chopper 103 representing the scale-reticle pattern which may constitute a light valve arrangement or a moire fringe pattern. The series of pulses forming a signal is in quantized form, the quantization having been done by the motor driven chopper disc 103 as illustrated in FIGURES 3 and 4. The second photodetector 102 receives a sinusoidal radiation signal from the conventional motor driven signal generator 104 including a rotatable polarized disk 105 and a stationary polarized disk 107. Both the chopper disk 103 and the polarized disk 105 are driven by the same drive motor 106. The phase of the pattern signal generated by the chopper disk with respect to the reference signal which is generated by the polarized generator is shifted by the phase correction servomotor 108 feeding into the differential gear 110 coupling the chopper disk 103 with the drive motor 106. The polarized signal generator 104 is coupled directly to the drive motor 110 via gear 112. The outputs of the photodetector circuit are amplified in gain adjustable amplifiers 113 and 114 respectively of high input impedance and low output impedance. Before comparing the two signal voltages in the differential amplifier 116 the voltage derived from the chopper disk 103 is passed through a low pass filter 115, thus making it sinusoidal and rendering it comparable to the signal generator voltage. In the differential amplifier 116 one of the two signal voltages is subtracted from the other. The resulting difference or "error" voltage at the output of the differential amplifier 116 has a certain phase relationship with respect to the signal generator voltage which is taken as the system reference voltage.

A servomotor is a phase sensitive device such that only the motor control field voltage component which is in quadrature (90° phase shift) with respect to the motor reference field voltage deliver torque. Two servosystems are shown in the drawings. A phase error correction servosystem 118 and an amplitude error correction servosystem 117.

The motor reference field voltages of the servomotors 108 and 109 are derived from the system reference voltage (polarized signal generator voltage). Since the error voltage component representing phase error is in quadrature with respect to the system reference voltage the motor reference field voltage of the phase error correction servomotor 108 is derived directly from the system reference voltage. On the other hand since the error voltage component representing amplitude error is in phase with respect to the system reference voltage the motor reference field voltage of the amplitude error correction servomotor 109 is derived from a voltage which is 90° phase shifted with respect to the system reference voltage.

With the proper phasing thus provided the error and voltage at the output of the differential amplifier 116 is fed into the two servomotors 108 and 109 after having been sufficiently amplified in amplifiers 120 and 122 and servo amplifiers 122 and 123 respectively. The phasing of the motor reference fields thus makes sure that the amplitude error correction servomotor 109 corrects only for amplitude errors and that on the other hand the phase error correction servomotor 108 corrects only for phase errors. In order to provide utmost stability of the servosystems rate feedback is furnished by feeding the outputs of generators which are part of servomotor-generator sets back to the inputs of the servo-amplifiers via damping control units 123 and 124.

In the case of the amplitude error correction servosystem 117, the servomotor 109 via a speedreducer 125 drives a potentiometer 127 which controls the photomultiplier 16 high voltage dynode supply of photodetector circuit 100 by means of voltage regulator 131 thus controlling the gain of that photomultiplier and adjusting the signal voltage amplitude to render it equal to the system reference voltage amplitude at the input of the differential amplifier 116. The voltage in the photodetector circuit 102 is controlled by power supply 129.

In the case of the phase error correction servosystem 118 the servomotor 108 via a speedreducer 130 and differential gear 110 speeds up or slows down the rotation of the chopper disk 103 thereby maintaining the signal voltage derived from this part of the system in phase with the system reference voltage as generated by the polarized signal generator 104.

The phase correction amounting in a shaft rotation which adds to or subtracts from the rotation of the chopper disk is proportional to the turntable angle to be measured. The digital transducers from which the digital readout is taken is therefore coupled to the shaft whose rotation is proportional to the phase error correction.

There are two digital transducers consisting of disks 150 and 151 each of which includes a number of radial slots. The distance between adjacent slot centers being the resolution of the readout namely one hundredth second in one disk, and one millionth degree in the other. Suitable gearing between the disks provides the conversion ratio of 10:3.6. A lamp 152 and photodetectors 153, 154, 155 and 156 are arranged with respect to the slotted disks 150, 151 in order to generate pulses in the detectors as the disks rotate. In order to detect the direction of rotation of the disks, two photodetectors are mounted behind each disk so that the electrical pulse generated in one of them when the disk rotates is shifted in phase by about 90 electrical degrees with respect to the other.

The pulses are amplified and fed into two reversible (bidirectional) counters 157 and 158.

The accumulating reversible counter 157 receives at its input in two channels the pulses from the disk 151 with the one millionth degree intervals and counts them forward or reverse depending on the direction of rotation of the disk. The accumulated count is visually displayed in 9 decimal digits and transferred into a shift register on application of a shift pulse from the output of the other reversible counter 158.

The second counter 158, the reset reversible counter, receives at its input in two channels, the pulses from the disk 150 with the one hundredth arc second interval and counts them forward or reverse depending on the direction of rotation of the disk. The counter is preset in selectable steps. At coincidence between the accumulated pulse count and the preset count an output pulse will occur and reset the counter to zero. The output pulse will also serve as shift-pulse for the shift register of the accumulating reversible counter 157 (as described above) and for the shift register of the timer unit 161.

The timer unit 161 consists of a highly accurate and stable frequency source of 10 mc. p.s. which via a 10:1 scaler feeds into a reset counter. The count increment thus is one micro second. These count pulses are fed into a reset counter with attached shift register. On application of a shift pulse the count is visually displayed in 9 decimal digits, transferred into the shift register and the reset counter is reset to zero.

A printer and a paper tape punch are included in the readout indicator 160 together with the above mentioned shift register and reset counter mechanisms described in the two preceding paragraphs. The accumulated count in the accumulating reversible counter 157 and the time interval from the reset counter 158 can be recorded as a function of the position interval preset in the reset reversible counter. The output pulse from this latter counter in addition to shifting and resetting will also trigger the print-out punchout selectro gating one shift register output after the other into the printer and punch and triggering the actual print-out and punch-out.

Operation

The operation of the device will be described in more detail with reference to the accompanying figures. For example, referring to FIG. 1, a circular scale 10, is uniformly divided into alternate transparent and opaque area portions which are preferably equal. A plurality of reticles are adapted to receive images of separate area portions of the scale 10. These area portions are for example, taken at 90° apart from each other and are imaged at unit magnification onto each of four reticles. The individual reticles are identical to corresponding parts of the circular divided scale, however, the angular position of each of the four reticles are so arranged that the images of the circular scale are displaced by ¼ of a cycle progressing from one reticle to the next.

Figure 2:
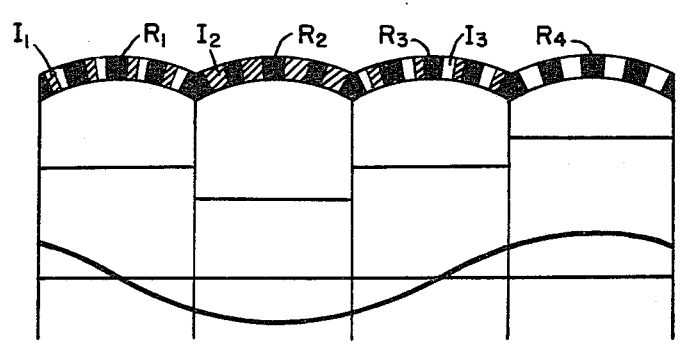
FIG. 2 is a schematic illustration showing the overlapping position of a reticle-scale combination, and the corresponding signal resulting therefrom.

The relative positions of the reticle are shown more clearly by reference to FIG. 2. In each of the four reticles the intensity of light passed by the combined circle and reticle divisions is for a particular position of the circle. Images I, $I_2$ and $I_3$ are shown in their positions with respect to the reticles $R_1$, $R_2$ and $R_3$. Referring to reticle $R_4$, the image of the opaque portion of the scale is superimposed on the opaque portion of the reticle $R_4$ and therefore the combination produces a maximum intensity. Conversely when the opaque portion of the scale is imaged onto the transparent area of the reticle $R_2$, i.e. $I_2$, there is an intensity minimum. At the intermediate points the intensity is proportional to the degree of overlap of the transparent areas.

The intensity of light transmitted by the scale-reticle combinations is cyclically sampled. That is, in succession the light tracked by recticles 1, 2, 3, 4, 1, 2 etc. is measured. These outputs are added and the sum fed into the photodetector 100 as previously set forth with reference to the electronic system.

FIG. 3 illustrates a method of cyclically sampling the four reticles. The cyclic sampling is done by means of the rotating disk 103. For example, the reticles are periodically illuminated through this rotating disk by means of fiber optic bundles. The light passing through the optical fibers images portions of the scale onto the respective reticles. The reticle scale image combinations act as light valves and regulate the light intensity which is directed to the photomultiplier by means of the second furcate bundle of optical fibers. In orderto determine the phase of the signal received by the photomultiplier, the phase of the signal received by the photomultiplier is compared with the phase of a master signal generated by the rotating polarizer. The rotating polarized disks 105 is driven by the shaft of the same drive motor, which is used to drive the chopper disk. The difference between the signal generated by the rotating polarized disk 105 and the signal generated by the rotating disk reticle-scale combination produce a signal which can be resolved into a signal at 90° (the quadrature signal) to the generating signal. This quadrature signal will either lead or lag the generating signal depending on the direction of the phase difference between the two generated signals.

The quadrature signal drives a servomotor in a direction to reduce the phase difference to zero. This is accomplished by having the rotating polarized disk 105 driven through a differential by both the drive motor and the servomotor. If the table rotates an amount corresponding to the division on the scale, the servomotor will make one full revolution in order to maintain a zero phase difference. The shaft rotation of the servomotor generates both analogue and digital signals. For example, a rotating reticle may produce 20 counts for each rotation of the servomotor. A digital output or a continuous rotation potentiometer may be geared to the shaft in order to obtain an analogue output.

The quadrature signal measures the angle of rotation, and the inphase component is used to match the amplitude of the signal generated by the polarized signal generator to the amplitude generated by the rotated scale. Therefore, when the inphase amplitude is reduced to zero, the signal generated by the polarized signal generator is equal to the signal generated by the rotating scale.

Figure 6:
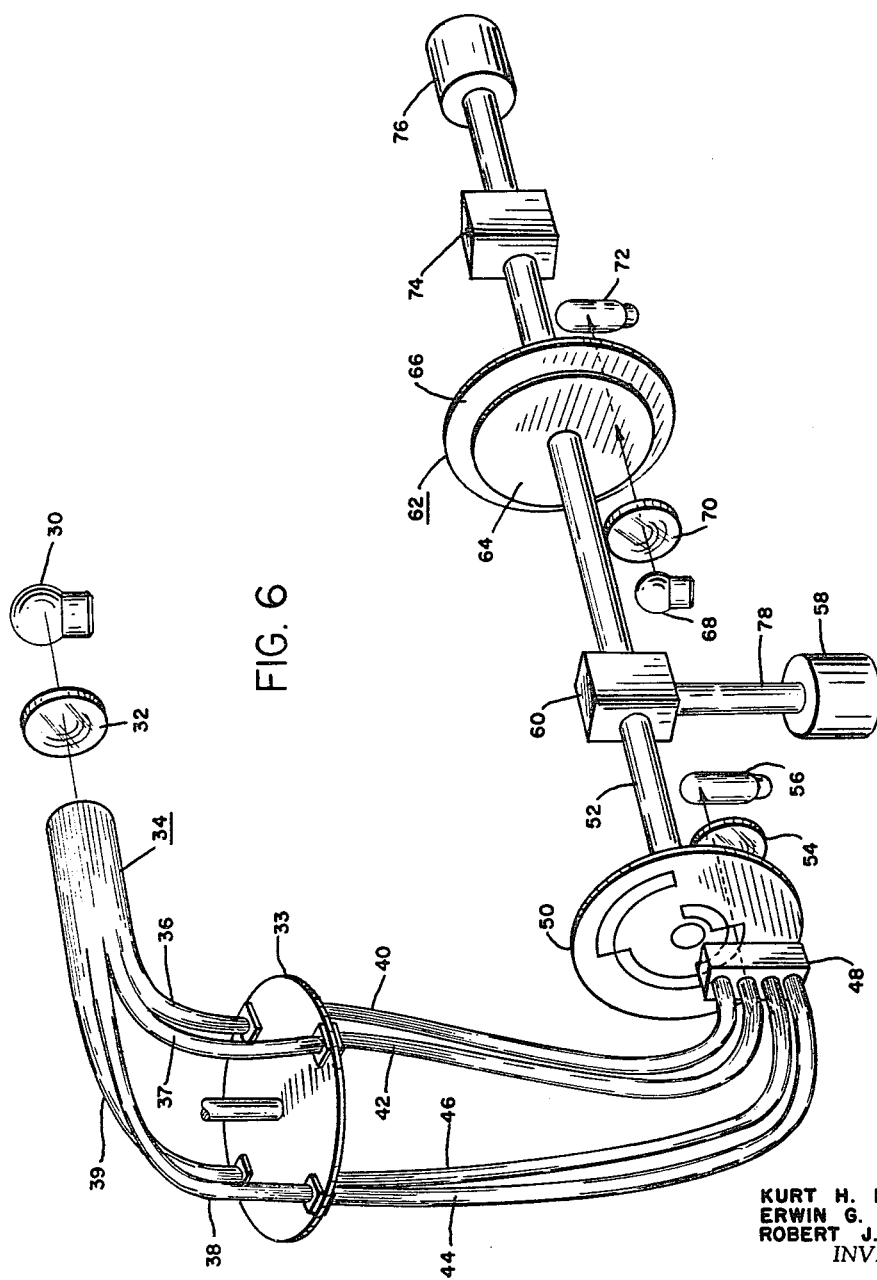
FIG. 6 is a schematic illustration of a third embodiment of the invention.

In the embodiment of FIG. 6 radiation is continuously applied to the scale-reticle combinations while the radiation from the combinations is sequentially directed to a photosensor. Furthermore, the phase of the reference generator is varied to maintain a constant phase relation between the signal generated by the photosensor and the reference signal.

Radition from a source 30 is directed by a collimating lens 32 to a comon end of a furcate bundle of optical fibers 34. The branches 36, 37, 38 and 39 of the furcate bundles are positioned along a scale 33 in the manner as previously set forth with regards to the apparatus in FIGURES 1 and 3. A plurality of reticles are positioned in optical series with the scale 33 in the manner as previously set forth with regards to FIG. 1. The reticles can be positioned above the scale so that the the light is first directed through the reticles to pass through the scale 33, or else below the scale as set forth in FIG. 1. Four bundles of optical fibers 40, 42, 44 and 46 are mounted having one end mounted in optical series with the scale-reticle combinations and the branches 36, 37, 38 and 39 respectively. The other end of the fiber bundles 40–46 are juxtaposed in a straight row by a suitable mounting means 48 with their ends in a plane parallel to the plane including a rotatable chopper disk 50.

The chopper disk 50 includes four arcuate slots radially spaced from a mounting shaft 52 by dimensions corresponding to the spacing between the fiber bundles 40–46. The chopper 50 functions in the same manner as previously set forth with regards to FIGS. 1, 3 and 4 to sequentially direct radiation from the plurality of fiber bundles 40–46 through a lens 54 to a photosensing device 56. The chopper disc 50 is driven at a substantially constant rate by a motor 58 suitably coupled to the chopper shaft 52 through a gear box 60.

The motor 58 is also coupled to drive a conventional polarized signal generator 62 through the gear box 60. The signal generator 62 includes the first rotatable polarized disk 64 mounted in a plane parallel relation to a second rotatable polarized disk 66. Radiation from a source 68 is directed by a lens 70 through both the polarized disks to a phososensor 72. The polarized disk 66 is coupled through a suitable gear box 74 to a servo motor 76.

The photosensor 56 receives the sequenced radiation signals in a manner as previously set forth with regards to FIGURE 2 and accordingly generates an electrical signal that is phase related to the movement and/or position of the scale 33 along its path of movement. The photosensor 72 generates an electrical signal at the same frequency as the photosensor 56 having its phase relation (with respect to the position of the disk shaft 52) determined by the position of the rotatable disk 66. The servo motor 76 is connected into the circuit of FIG. 5 as previously set forth with regards to motor 108 to drive the disk 66 to maintain the phase relation between the signals generated by the photosensors 56 and 72 substantially equal. The servo motor 76 is also coupled to drive the optical disks 150 and 151 to provide a readout corresponding to the movement and/or position of the scale as previously set forth with regards to FIG. 5.

What is claimed is:

1. The combination comprising:

a scale having a plurality of interspaced radiation opaque and transparent sectors;

means for mounting said scale for movement along a predetermined path;

a plurality of reticles, each having at least one radiation transparent sector;

mounting means mounting said plurality of reticles along said path with a different positional phase relation between the transparent sectors of various ones of said plurality of reticles and the transparent sectors of said scale providing a plurality of separate radiation transparent passages through the various scale-reticle combinations, said passages varying in size in substantially identical cyclic patterns in response to a movement of said scale, with a preset phase shift in the cyclic patterns between said passages;

radiation sensitive means for generating an electrical signal in response to radiation applied thereto;

generator means for generating a periodic reference signal;

means for directing radiation through said variable passages into a common area fixed in space in a preset sequence determined by said phase shift between said passages and at the same periodic rate as said reference signal;

means positioning said radiation sensitive means at said common area so that said radiation sensitive means generates an electrical signal at the same frequency as said reference signal and having a phase relation with respect to said reference signal determined by the position of the scale with respect to said reticles;

control means receiving said electrical signal and said reference signal being responsive to the phase difference therebetween to control said means for directing radiation to maintain the phase relation between said reference signal and said electrical signal substantially constant; and indicator means responsive to said control means for providing an indication corresponding to the movement of said scale.

2. The combination as defined in claim 1 including automatic gain control means coupled between said generator means and said radiation sensitive means for comparing the amplitude of said electrical and reference signals and controlling the gain of said radiation sensitive means so that the amplitude of said electrical signal is a function of the amplitude of said reference signal.

3. The combination as defined in claim 1 wherein said means for directing radiation comprises:

a plurality of optical fiber bundles mounted to direct radiation from a source through said plurality of variable passages toward said common area; and chopper means positioned for sequentially interrupting the radiation directed through said plurality of fiber bundles so that radiation is received by said radiation sensitive means from various ones of said plurality of passages in said preset sequence.

4. The combination as defined in claim 2 including optical means for forming an image of a plurality of transparent sectors of said scale on said plurality of reticles.

5. The combination as defined in claim 3 wherein:

one end of said plurality of optical fiber bundles is juxtaposedt o form a row; and said chopper means includes a disc mounted for rotation in a plane substantially parallel to said row, said disc being formed with a plurality of radiation transparent arcuate slots radially spaced from the point of rotation of said disc at various distances determined by the spacing of said plurality of optical fiber bundles in said row, and motor means for rotating said disc at a substantially constant rate whereby said slots in said disc provide a passage for radiation from said passages of said various scale-reticle combinations to said radiation sensitive means in a continuous periodic sequence.

6. An optical-electrical system comprising:

a scale, formed with a plurality of uniform markings thereon, mounted for movement along a predetermined path;

a plurality of reticles, each of said reticles being formed with at least one radiation transparent passage;

means including a source of radiation for directing radiation toward said scale;

lens means mounted along said path for transmitting images of separate portions of said scale markings;

mounting means mounting said plurality of reticles along said path with each reticle receiving an image of a separate portion of said scale markings and with a different phase relation between the images received and the position of the transparent passages of said plurality of reticles so that the pattern of intensity of radiation passing through each of said plurality of reticles varies in a substantially cyclic pattern in response to the movement of said scale with a predetermined phase shaft between the cyclic patterns;

means for directing radiation from said plurality of reticles towards a common area fixed in space;

first circuit means, including a photosensor, for generating an electrical signal in response to radiation applied to said photosensor;

generator means for generating a periodic reference signal;

variable scanning means interrupting radiation from said plurality of reticles to said common area at the same periodic rate as said reference signal and in a preset sequence determined by said phase shift;

means positioning said photosensor at said common area whereby said first circuit means generates an electrical signal of the same frequency as said reference signal as a function of the relative position of said scale with respect to said reticles;

second circuit means coupled to said generator means and said first circuit means for producing a control signal responsive to the phase difference between said reference signal and said electrical signal; and means coupled between said second circuit means and said variable scanning means responsive to said control signal adjusting said scanning means to maintain the phase of said electrical signal substantially constant with respect to said reference signal.

7. An optical-electrical system comprising:

a scale, comprising a plurality of equally spaced transparent sectors, mounted for movement along a predetermined path;

a plurality of reticles, each having at least one transparent sector;

mounting means mounting said plurality of reticles along said path with a different positional phase relation between the transparent sectors of various ones of said plurality of reticles and the transparent sectors of said scale providing a plurality of separate transparent passages through various scale-reticle combinations, said passage varying in size in substantially identical cyclic patterns in response to a movement of said scale, with a preset phase shift in the cyclic patterns between said passages;

means for directing radiation through said plurality of variable passages provided by said scale-reticle combinations, toward a common area fixed in space;

first circuit means including a photosensor for generating an electrical signal in response to radiation applied to said photosensor;

generator means for generating a periodic reference signal;

means interrupting the radiation dircted through said plurality of passages at the same periodic rate as said reference signal and in a preset sequence determined by said preset phase shift;

means positioning said photosensor to receive said interrupted radiation at said common area whereby said circuit means generates an electrical signal of the same frequency as said reference signal and having a variable phase with respect to said reference signal that is a function of the relative position of said scale with respect to said reticles;

second circuit means coupled to said reference generator and said first circuit means for producing a control signal responsive to the phase difference between said reference signal and said electrical signal; and control means coupled to said means interrupting the radiation, responsive to said control signal for maintaining the phase between said electrical signal and said reference signal substantially constant.

8. An optical electrical system comprising:

a scale having a plurality of interspaced radiation reflecting scale markings;

means for mounting said scale for movement along a predetermined path;

a plurality of reticles, each having at least two radiation transparent sectors, positioned along said path with a different positional relation between the transparent sectors of various ones of said plurality of reticles and said reflecting scale markings, the amount of radiation reflected from the scale through the plurality of reticles follows a substantially identical cyclic pattern as a function of the movement of said scale with a preset phase shift between said patterns;

radiation sensitive means for generating an electrical signal in response to radiation applied thereto;

generator means generating a periodic comparison signal;

means, including a source of radiation, directing radiation towards said scale for reflecting through said plurality of reticles to said radiation sensitive means;

means interrupting the radiation reflected through said reticle at the same periodical rate as said comparison signal and in a sequence determined by said preset phase shift whereby said radiation sensitive means generates a periodic electrical signal having a variable phase that is a function of the position of said scale; and control means coupled between said radiation sensitive means and one of said generator means and said means directing radiation, responsive to said electrical signal for maintaining the phase relation between said comparison signal and said electrical signal substantially constant.

9. The optical electrical system as defined in claim 8 including automatic gain control means coupled between said generator means and said radiation sensitive means for comparing the amplitude of said electrical and reference signals and controlling the gain of said radiation sensitive means to maintain the amplitude of said electrical signal a function of the amplitude of said reference signal.

10. An optical electrical system as defined in claim 8 wherein said means for directing radiation includes:

a first furcate bundle of optical fibers having a common end receiving radiation from said source and a plurality of branches directing said radiation towards various portions of said scale; and a second furcate bundle of optical fibers having a plurality of branches receiving radiation reflected through said plurality of reticles and directing said radiation through a common end towards said radiation sensitive means.

11. An optical electriual system as defined in claim 8 including optical means positioned between said scale and said plurality of reticles for forming images of different portions of said scale on said plurality of reticles.

12. An optical-electrical system as defined in claim 10 wherein said means interrupting the radiation comprising:

a disk mounted for rotation adjacent a common end of one of said furcate bundles, said disk being formed with the plurality of radiation transparent arcuate slots located at various distances from a point of rotation of said disk; and motor means for rotating said disk at a substantially constant rate.

13. An optical-electrical system comprising:

a plurality of variable light valves including a common scale mounted for movement along a predetermined path and a plurality of reticles mounted along said path with different positional phase relations between various ones of said reticles and said scale so that the amount of radiation transmitted through said light valves follows a cyclic pattern with a preset phase shift between patterns of said plurality of light valves;

radiation sensitive means for generating an electrical signal in response to radiation applied thereto;

means for directing radiation through said plurality of light valves towards a fixed area in space;

generator means for generating a periodic comparison signal;

means periodically interrupting said radiation directed through the plurality of light valves in accordance with said preset phase shift and at the same rate as the frequency of said comparison;

means mounting said radiation sensitive means at said fixed area in space to receive the interrupted radiation from said plurality of light valves so that radiation sensitive means generates a periodic electrical signal that is phase related to the position of said scale along said path;

circuit means for comparing the phase of said comparison signal and said electrical signal for generating a difference signal; and control means responsive to said difference signal for maintaining the phase relation between said comparison signal and said electrical signal substantially constant.

14. An optical-electrical system as defined in claim 13 wherein said means for directing radiation includes:

a first furcate bundle of optical fibers directing radiation from a single source through a plurality of branches to said plurality of light valves; and a second furcate bundle of optical fibers positioned to receive radiation from said plurality of light valves through a plurality of branches and directs said radiation towards said fixed area in space.

15. An optical system as defined in claim 14 wherein:

said first furcate bundle of optical fibers includes a common bundle wherein the ends of said branches are juxtapositioned to form a row; and said means periodically interrupting said radiation includes a rotating chopper disk having a plurality of arcuate radiation transparent passages corresponding to the number of branches that are radially spaced from the point of rotation of said disk in accordance to the spacing of said branches in said row.

16. An optical-electrical system as defined in claim 14 wherein:

said second furcate bundle of optical fibers includes a common bundle wherein the ends of said branches are juxtapositioned to form a row; and said means periodically interrupting said radiation includes a rotating chopper disk having a plurality of arcuate radiation transparent passages corresponding to the number of branches that are radially spaced from the point of rotation of said disk in accordance to the spacing of said branches in said row.

17. An optical-electrical system as defined in claim 14 wherein:
  said means for interrupting said radiation includes a chopper, a motor and variable coupling means coupling said chopper to said motor; and
  said control means is coupled to said variable coupling means.

18. An optical-electrical system as defined in claim 14 wherein:
  said generator means includes variable means for varying the phase of said comparison signal; and
  said control means is coupled to said variable means.

No references cited.

RODNEY D. BENNETT, JR., Primary Examiner

JOSEPH G. BAXTER, Assistant Examiner

U.S. Cl. X.R.

356—169, 170